United States Patent [19]

Weinstein et al.

[11] Patent Number: 5,350,589
[45] Date of Patent: Sep. 27, 1994

[54] PNEUMATIC CEREAL ROPE CONVEYING AND CONDITIONING METHOD

[75] Inventors: James N. Weinstein, Minneapolis; Craig E. Zimmermann, Waconia, both of Minn.

[73] Assignee: General Mills, Inc., Minneapolis, Minn.

[21] Appl. No.: 37,699

[22] Filed: Mar. 29, 1993

[51] Int. Cl.$^5$ .............................................. A21D 6/00
[52] U.S. Cl. .................................... 426/496; 426/497; 426/503
[58] Field of Search ............... 426/496, 497, 503, 517, 426/549; 99/352, 467, 477

[56] References Cited

U.S. PATENT DOCUMENTS 3,646,894  3/1972  Hasten et al. ..................... 426/503
4,689,237  8/1987  Fabre ................................. 426/521

FOREIGN PATENT DOCUMENTS 2054971  5/1992  Canada .

Primary Examiner—George Yeung
Attorney, Agent, or Firm—John A. O'Toole; L. MeRoy Lillehaugen

[57] ABSTRACT

An apparatus for pneumatically conveying a plurality of continuous ropes (20) of cooked cereal dough (20), e.g., from the diehead (24) of a cereal ingredients cooker extruder (22) to a cereal piece forming apparatus. The apparatus (10) includes a plurality of conveyance tubes (12, 14, 16, 18) each comprising a telescoping, flared inlet member (30) for adjustably connecting to the diehead (24) to facilitate start-up; a means for supplying conditioned air to cool and/or dry the rope during conveyance (36); a venturi eductor (40) to provide pneumatic conveyance; and an elongated conveyance tube (48). In preferred embodiments, the apparatus further includes a motive air supply system for multiple adjustable venturis but employing a single air compressor.

10 Claims, 4 Drawing Sheets

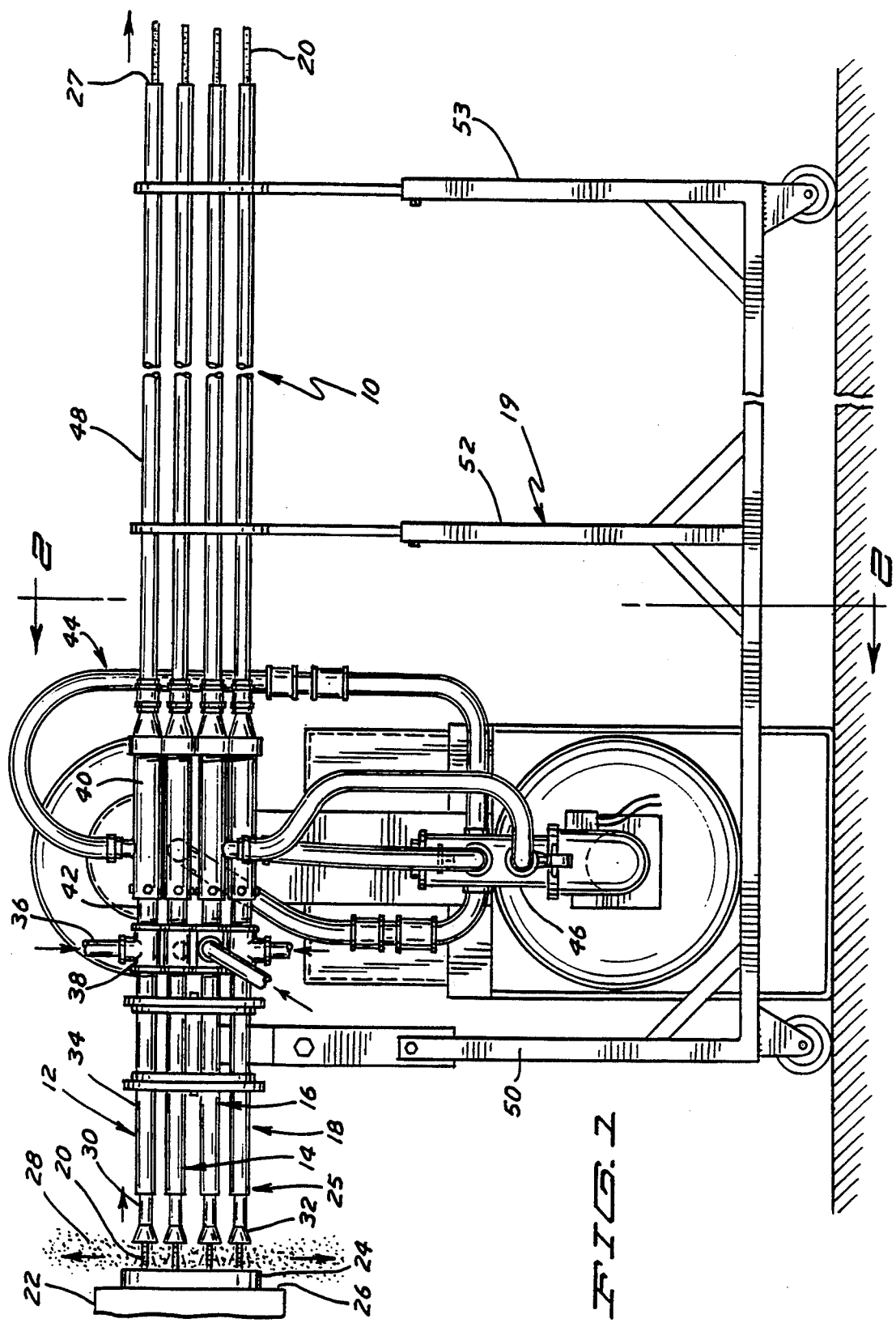

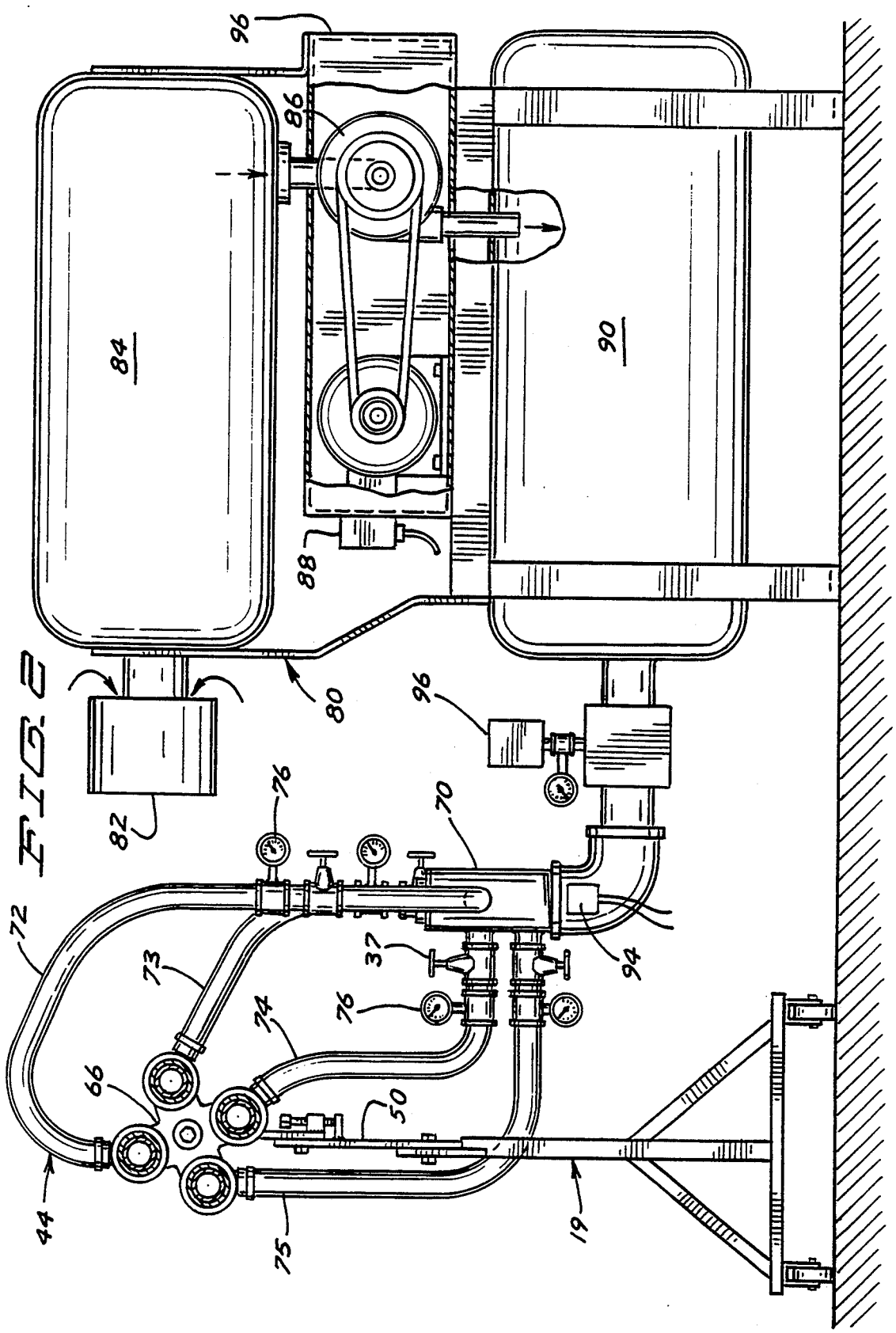

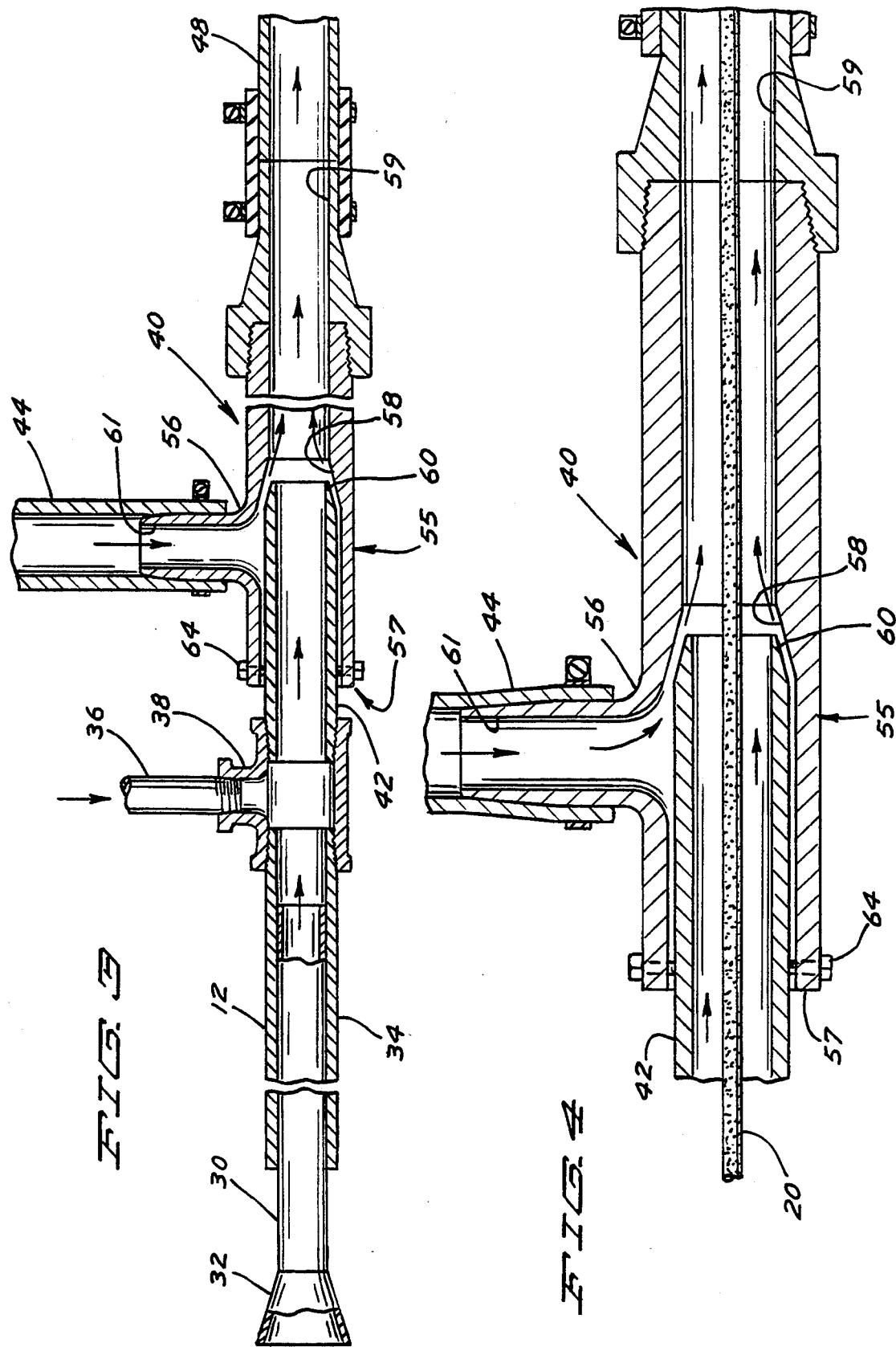

PNEUMATIC CEREAL ROPE CONVEYING AND CONDITIONING METHOD

FIELD OF THE INVENTION

The present invention generally relates to food processing apparatus and methods. More particularly, the present invention relates to apparatus and methods for conveying a continuous rope of cooked cereal dough.

BACKGROUND

Ready-To-Eat cereal products (R-T-E) cereals are increasingly popular food products. Generally, such R-T-E cereal products are fabricated from a cooked cereal dough that is formed into suitably shaped and sized pieces or pellets which are then further processed to prepare the finished R-T-E cereal product.

Cooker extruders are increasingly used to process the raw materials of flour, sugar, adjuvants and water to prepare the cooked cereal dough. Cooker extruders have the advantage of requiring only very short processing times. Additionally, cooker extruders can process large quantities of products in a relatively short period of time.

In some applications, a cooked cereal product is extruded at low extrudate linear speeds such as when the extruder is equipped with a die face reciprocating knife cutter that segments the rope(s) extrudate into individual pieces. In other applications, the extrudate rope is fed into a collecting bin wherein the cooked cereal extrudate ropes form a cereal mass that is allowed to temper. In still other applications, the rope is extruded at low velocities and fed to a receiving conveyor belt which conveys the rope to the next processing station.

Under certain conditions, especially with high capacity cooker extruders, the extrudate rope exits the cooker extruder at high linear velocities. It is not uncommon for the ropes to exit at linear speeds of up to 160 meters per minute. One difficulty with such high speeds of extrudate is to convey the rope to the next processing station in a continuous rope form. Conventional conveyor belts have great difficulty in achieving such line speeds. Furthermore, feeding the ropes into downstream equipment is very difficult from a conventional conveyor belt at these speeds. Additionally, conveyor belts traveling at such high line speeds pose a significant potential for injury.

Still another problem concerns the importance of maintaining the shape of the cooked cereal dough extrudate. In certain R-T-E cereal applications, the extrudate rope exits the extruder in a soft, plastic state which often desirably experiences expansion or puffing immediately upon exiting the extruder die face. Conventional conveying means such as belt conveyors can result in deformation of the lower soft puffed portion of the extrudate rope that is in immediate contact with the belt conveyor.

Still another problem resides in the initial start-up of the extrudate rope. Initially, the linear exit velocity from the extruder may not be the same as when the cooker extruder is running at an established steady state operating condition. Accordingly, cooked cereal rope conveying apparatus must accommodate such variation in exit velocity without deforming (e.g., curling) the rope.

Still another problem is that frequently it is desirable to additionally condition the extrudate rope before the rope reaches the next processing station. Such condition might involve cooling, drying, and/or heating.

Surprisingly, the above problems can be overcome with improved apparatus and methods provided for conveying high velocity cooked cereal dough ropes without deformation and, optionally, with simultaneous conditioning. The improvement resides in providing an adjustable inlet and receiving member to a venturi eductor provided with motive air. In more preferred embodiments, the improvement further resides in providing a single manifold means for supplying high volumes of low pressure motive air to a plurality of such conveyance and conditioning tubes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

SUMMARY OF THE INVENTION

The present invention thus resides in one or more improvements separately or in combination. First, the improvement provides adjustable means for engagement with the extruder diehead. Second, the invention provides an improvement in the provision of conditioning the cereal rope to improve its properties for the next process station while in transit to that station. Third, the present apparatus provides for the conveyance of cooked, puffed cereal dough ropes exiting a cooker extruder at high linear speeds and without deformation. Additionally, in preferred embodiments the present invention provides a single constant pressure manifold that can supply motive air to a plurality of conveyance tubes at controlled high volumes of low pressure air from a single air supply source.

BRIEF DESCRIPTION OF THE DRAWINGS

FIG. 1 is a side view of an apparatus for the pneumatic cereal rope conveying and cooling apparatus according to the preferred teachings of the present invention partially broken away.

FIG. 2 is a sectional view taken along lines 2—2 of FIG. 1.

FIG. 3 is an enlarged sectional view of one representative conveyor tube in an initial position with motive air prior to feeding of a cereal rope.

FIG. 4 is an enlarged sectional view similar to FIG. 3 shown with the cereal rope being conveyed.

Figure 5:
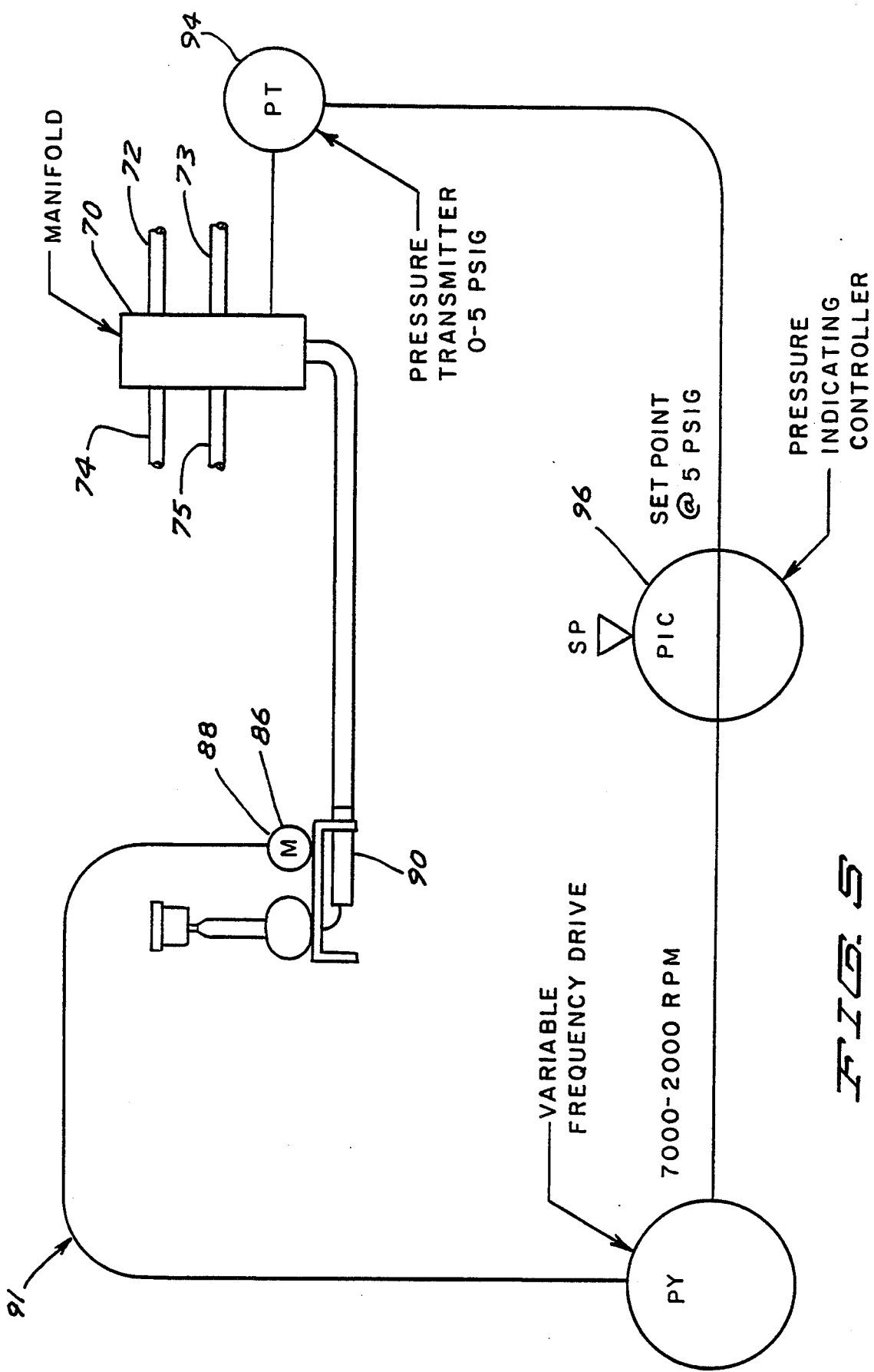
FIG. 5 is a simplified control schematic showing the control of the motive air supply.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first," "second," "inner," "outer," "axial," "radial," and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Referring now to the drawings and in particular to FIG. 1, an apparatus utilizing the present methods for simultaneously conveying and conditioning of a rope of cooked cereal dough according to the preferred teachings of the present invention is shown and generally designated 10.

In particular, it can be seen in FIG. 1 that the apparatus 10 comprises at least one and preferably a plurality of individual pneumatic conveyor tubes such as the four tubes 12, 14, 16 and 18 arranged in an array. The tubes are generally similar in design and construction. For convenience, reference is made in particular to tube 12. However, the skilled artisan will appreciate that tubes 14, 16 and 18 are of similar construction. However, while similar, each tube does not need to be identical in every feature or detail. Each tube is supported by a frame 19 as described in further detail below. Each individual tube receives at its inlet end 25 a continuous rope of cooked cereal dough 20 from a supply of cooked cereal dough in rope form such as a conventional cooker extruder 22.

The cooker extruder 22 is seen in FIG. 1 to be equipped with a diehead 24 having a plurality of orifices (not shown) through which the cereal dough ropes 20 are extruded. The arrangement and number of orifices depend in known manner upon such factors as extruder capacity, size of dough ropes, exit pressures, and other such processing factors. Typically, however, this cereal dough 20 will be extruded from the cooker extruder 22 at high linear speeds of up to 160 meters per minute when steady state conditions are reached. Depending upon the type of finished product desired, the cooked cereal dough extrudate 20 can be puffed or unpuffed. Also, the extrudate rope 20 can be a single rope whether solid or hollow or can be a coextruded rope having an exterior shell of a cooked cereal dough with an interior filling core of a second material such as a sugar or fruit filling or fat based filling such as cheese.

The skilled artisan will also appreciate that the particular number and arrangement of the individual conveyor tubes selected will depend upon the number of exit orifices in the diehead 24 with one tube servicing a single dough rope exiting from one diehead orifice.

While the exit velocity of the cereal dough ropes, once the cooker extruder has reached steady state operating conditions, remains relatively constant, during start-up conditions the extrudate rope linear velocity is lower and variable. It is essential then that the inlet or receiving end 25 of the conveyor tube be able to make direct contact with the exterior face 26 of the diehead 24 so that the rope is properly fed to the appropriate conveyor tube. However, once the cooker extruder has reached steady state conditions, it is desirable that the receiving end be spaced from the diehead exterior face 26, not shown in FIG. 1, to allow venting of steam and moisture.

Importantly, the cereal rope as it exits the diehead, especially for those applications in which the cereal dough is puffed or directly expanded at the diehead, evolves or flashes off moisture in the form of steam 28 as depicted in FIG. 1. Were the receiving end 25 not adjustably spaced from the diehead exterior face 26, then the steam 28 would be conveyed along with the cooked dough cereal rope rather than escaping. The conveyor tubes each have a discharge end 48 which terminates proximate the next processing station which is typically a piece former or pelletizer (not shown). If the steam is not allowed to escape but is rather conveyed along with the rope 20, then the rope 20 can be undesirably moist and sticky upon entering the pelletizer. Such excessive moisture can aggravate the problem of dough sticking to the pelletizer leading to fouling of the pelletizer and failure to form desirably sized and shaped pellets. These problems are particularly severe when the piece former is operated at high speeds to accommodate the high output of the extruder and the resulting high rope velocities.

In FIG. 1, it is seen that the apparatus 10 includes a means for adjustably operatively and removably connecting the conveying tubes, e.g., 12, to the diehead 24 which can include a laterally slidable or telescoping inlet member 30. Inlet member 30 at its inlet or receiving end includes a flared orifice or receiving funnel or "ear" 32. In preferred embodiments, the receiving funnel's outer orifice that abuts the diehead 24 is elliptical rather than circular. Such an elliptical configuration allows for closer spacing of the ears 32 and thus, an increased number of the diehead's extrudate orifices. Such denser spacing allows for greater throughputs of cereal dough ropes. The tubes, e.g., 12, each comprise an intermediate connecting member 34 having a slightly larger inner diameter than the outer diameter of inlet member 30 which allows for member 30 to be slidable therein.

Connecting tube member 34 in turn is operatively connected at its downstream end to a means for supplying conditioning air to the tube 12 such as conditioning air supply or hose 36 operatively connected to a "T" pipe member 38. Importantly, each conditioning air supply to each tube is at the same pressure. In more preferred embodiments, the conditioning air supply is isobaric, i.e., the air pressure does not vary materially from desired established pressure values. The skilled artisan will further appreciate that conditioning air is not always required. Conditioning air can be cool, dry air or have other qualities as desired depending upon the particular food product being processed. Generally, the conditioning air will be at 40° to 60° F. (3° to 20° C.) and about 15 to 20 psia (90 to 140 KPa). The amount of conditioning air supplied is controlled by conventional means such as air supply valves (not shown).

Still referring to FIG. 1, each tube, e.g., 12, is seen to further include a venturi eductor 40 operatively connected at its upstream or receiving end to the tube 12 conveniently such as by connecting tube member 42. Each venturi eductor 40 is provided with a motive air supply 44. In highly preferred embodiments, the plurality of motive air supply tubes are each fed from a single motive air supply 44 as described in greater detail below. The motive air supply provides relatively larger volumes of air compared to the conditioning air supply. The motive air supply generally has a pressure of about to 15 to 20 psia. The motive air is often at slightly warmer temperatures (140° F.) than ambient due to compression.

The venturi eductor member 40 serves to provide suction to pneumatically convey the dough rope 20 through the tube. The venturi eductor 40 is operatively connected at its discharge end to elongated conveyance tube member(s) 48 that terminate proximate the position of the next downstream processing station, e.g., a pelletizer (not shown) either directly or employing intermediate coupler fittings as shown.

In the embodiment depicted in FIG. 1, elongated conveyance members 48 are depicted as being relatively straight and horizontal in orientation. However, it is an advantage of the present invention that the elongated conveyance members 48 can be fabricated in a variety of shapes and configurations so long as sharp corners are avoided.

Briefly, it can be seen in FIG. 1 that the frame 19 additionally included means for adjusting the elevation and pitch of the tubes 12 such as making frame vertical support members 50, 52 and 53 adjustable in length by conventional means.

Reference now is made briefly to FIGS. 3 and 4 which generally depict the venturi eductor subassembly in detail. In particular, it is seen that the venturi eductor 40 comprises a throat member 55 that is generally T-shaped including a product receiving orifice 57, a discharge orifice 59, a motive air supply orifice 61 and a venturi throat portion 56. Also, it is seen that connecting member 42 has a downstream tapered portion or suction nozzle tip 60 in the venturi throat 58. The suction nozzle or connecting member 42 is axially slidably movable within the receiving orifice 57. Once the desirable venturi gap is established (e.g., 0.025 inch) then the longitudinal position of connecting member 42 relative to member 56 is secured such as by set screws 64.

Reference is now made briefly to FIG. 2 which generally shows the motive air supply 44. Before describing the motive air supply 44, however, it can be seen that the frame 19 can include a plurality of array bracket support members such as member 66 depicted for supporting the tubes in a spaced array pattern. The bracket 66 is mounted upon and secured to adjustable vertical support member 50.

FIG. 2 depicts a single or common motive air supply manifold 70 for supplying a plurality of motive air supply tubes such as tubes 72, 73, 74 and 75. Each motive air supply tube is operatively connected to one pneumatic conveyor tube as depicted. At their receiving ends, the air tubes are operatively connected to the manifold 70. Each tube is equipped with a pressure gauge 76 as well as a valve 37 to individually adjust to volume of air being supplied to a particular tube. The motive air supply additionally includes a compressor assembly 80 comprising an air inlet 82 preferably having an air filter (not shown), and a muffler 84, a compressor 86 driven by a variable speed electric motor 88, a compressed air reservoir 90, and a compressor control system 91 (see FIG. 5) comprising in operative combination a pressure sensor 92, a pressure transducer 94 and a pressure indicating controller ("PIC") 96. Preferred for use herein are proportional integral derivative PICs. The variable speed electric motor 88 is controlled by the pressure indicating controller 96 in response to minor variations in pressure as measured by the pressure transducer 94 which sends its pressure information signal to the PIC. Useful herein for the PIC is any conventional PIC type controller which is widely available.

The operability of the compressor control system is better understood by reference to FIG. 5 which shows the blower control schematic diagram. A surprising benefit of the present motive air supply system is employment of a single compressor and compressed air manifold which surprisingly can supply high volumes of low pressure motive air to a plurality of motive air supply tubes which supply multiple venturi eductors as compared with other systems that require individual compressors. Reduction in the number of such expensive components greatly reduces the cost of the present motive air supply system.

Previously, when multiple eductors have been supplied by a single constant speed compressor, a problem has been that the blower motive air flow to the eductors could not be easily regulated. Since the single speed compressor supplies a fixed amount of air, any change in motive air flow to one eductor will cause the motive air flow to change in all the eductors. This makes balancing or adjusting motive air flow between multiple eductors difficult. To get around this problem, it has been the general practice to supply each eductor with a separate compressor assembly.

The present invention described above, however, includes a means to supply multiple eductors with a single compressor assembly while still allowing for simple adjustment of the quantity of motive air flow to each eductor. With this invention, adjusting motive air flow to any one eductor will not have an effect on the other eductors. This is accomplished by using a pressure feedback control and a variable speed compresssor assembly. A given pressure set-point in the motive air manifold 70 is maintained by automatically adjusting compressor assembly's 80 output to match downstream load. For example, if one eductor is turned off, the pressure sensor 92 will sense an increase in manifold pressure; the controller 96 will then send a signal for the electric motor 88 to slow down and thus slow the compressor down to match the pressure set-point. This is all done continuously without any operator input.

Now that the structure of the present apparatus 10 has been described according to the preferred teachings of the present invention, the operation of apparatus 10 can be set forth and appreciated.

OPERATION OF THE INVENTION

The first step in the start-up of the present apparatus is to fully open all valves 37 and 78 in the motive air supply lines to the eductors that are to be used, (e.g., if three cereal ropes are to be run and there are four eductors, one valve would be closed). Next, is to adjust the pressure set-point to the pressure used to feed cereal ropes, e.g., 18 psia. The third step is to start the compressor assembly.

After the ropes are ready, (e.g., proper amount of cook, correct moisture level, etc.) the next step is to feed each individual rope through its corresponding inlet member. Before the ropes are fed into the inlet member, they drop to the floor. To feed a rope, the inlet member, which telescopes from the connecting member, is moved with one hand directly up to the extruder head while at the same time the rope is broken with the other hand. Suction being drawn through the inlet tube instantaneously draws the rope into the conveyor tube and conveys the rope to a downstream piece of processing equipment. Once the ropes are directed to the desired tubes, the next step is to retract the inlet member 30 away from the extruder head to allow steam to vent. This is repeated for each rope. The ropes are then rapidly conveyed to the piece forming station downstream where the ropes are formed into individual sized and shaped pieces. Such forming generally includes the substeps of sealing and crimping the pieces.

What is claimed is:

1. A method for pneumatically conveying and conditioning a cooked dough rope, comprising the steps of:
   A. providing a continuous cooked cereal dough rope having
      about 12% to 30% moisture,
      a temperature of about 212° F. to 270° F. (100° to 132° C.),
      a linear velocity of about 50 to 250 m/min., and
      a diameter of about 0.10 to 1.50 in.;
   B. continuously pneumatically conveying the dough rope to a piece forming apparatus; and
   C. forming the rope into individual shaped and sized pieces.

2. The method of claim 1 wherein Step A includes the substeps of:
   1. extruding the cooked cereal dough rope from a cooker extruder,
   2. venting steam from the cooked cereal dough rope.

3. The method of claim 2 wherein the cooked cereal dough is puffed.

4. The method of claim 3 wherein the cereal dough rope is tubular.

5. The method of claim 4 wherein in Step A the linear velocity is about 100 to 200 m/min.

6. The method of claim 5 wherein the dough rope includes a filling.

7. The method of claim 5, comprising:
   A. providing a plurality of continuous cooked cereal dough ropes each having
      about 12% to 30% moisture,
      a temperature of about 212° to 270° F. (100° to 132° C.),
      a linear velocity of about 50 to 250 m/min., and
      a diameter of about 0.10 to 1.50 in.;
   B. individually continuously pneumatically conveying the dough ropes to a piece forming apparatus; and
   C. forming the ropes into individual shaped and sized pieces.

8. The method of claim 4 wherein Step B includes the substeps of:
   1. providing a first motive air for pneumatic conveying having a pressure of about 16–20 psia.
   2. providing a second conditioning air supply having a temperature of about 40° to 80° F. and a pressure of about 16–20 psia.

9. The method of claim 8 wherein the volume ratio of first motive air to second conditioning air ranges from about 2 to 100:1.

10. The method of claim 6 wherein the filling is a fruit puree or creme filling.

* * * * *